United States Patent van der Ziel

[11] B 3,982,135
[45] Sept. 21, 1976

[54] PHASE MATCHING IN A LAMINAR STRUCTURE

[75] Inventor: Jan Peter van der Ziel, Chatham, N.J.

[73] Assignee: Bell Telephone Laboratories, Incorporated, Murray Hill, N.J.

[22] Filed: Jan. 14, 1975

[21] Appl. No.: 540,872

[44] Published under the second Trial Voluntary Protest Program on January 20, 1976 as document No. B 540,872.

[52] U.S. Cl. .............................. 307/88.3; 321/69 R
[51] Int. Cl.² .................................... H02M 5/04
[58] Field of Search ................... 307/88.3; 321/69 R

[56] References Cited
UNITED STATES PATENTS
3,537,020   10/1970   Anderson ........................... 330/4.5

OTHER PUBLICATIONS

"Applied Physics Letters," 17, pp. 483–485, (1970), Bloembergen et al.
"Applied Physics Letters," 19, pp. 266–268, (1971), Anderson et al.
"Journal of Applied Physics," 44, pp. 3180–3181, (1973), Yacoby et al.

Primary Examiner—R. V. Rolinec
Assistant Examiner—Darwin R. Hostetter
Attorney, Agent, or Firm—M. J. Urbano

[57] ABSTRACT

Described is a technique for obtaining phase matched second harmonic generation in a laminar structure with the optical radiation propagating parallel to the layers.

16 Claims, 2 Drawing Figures

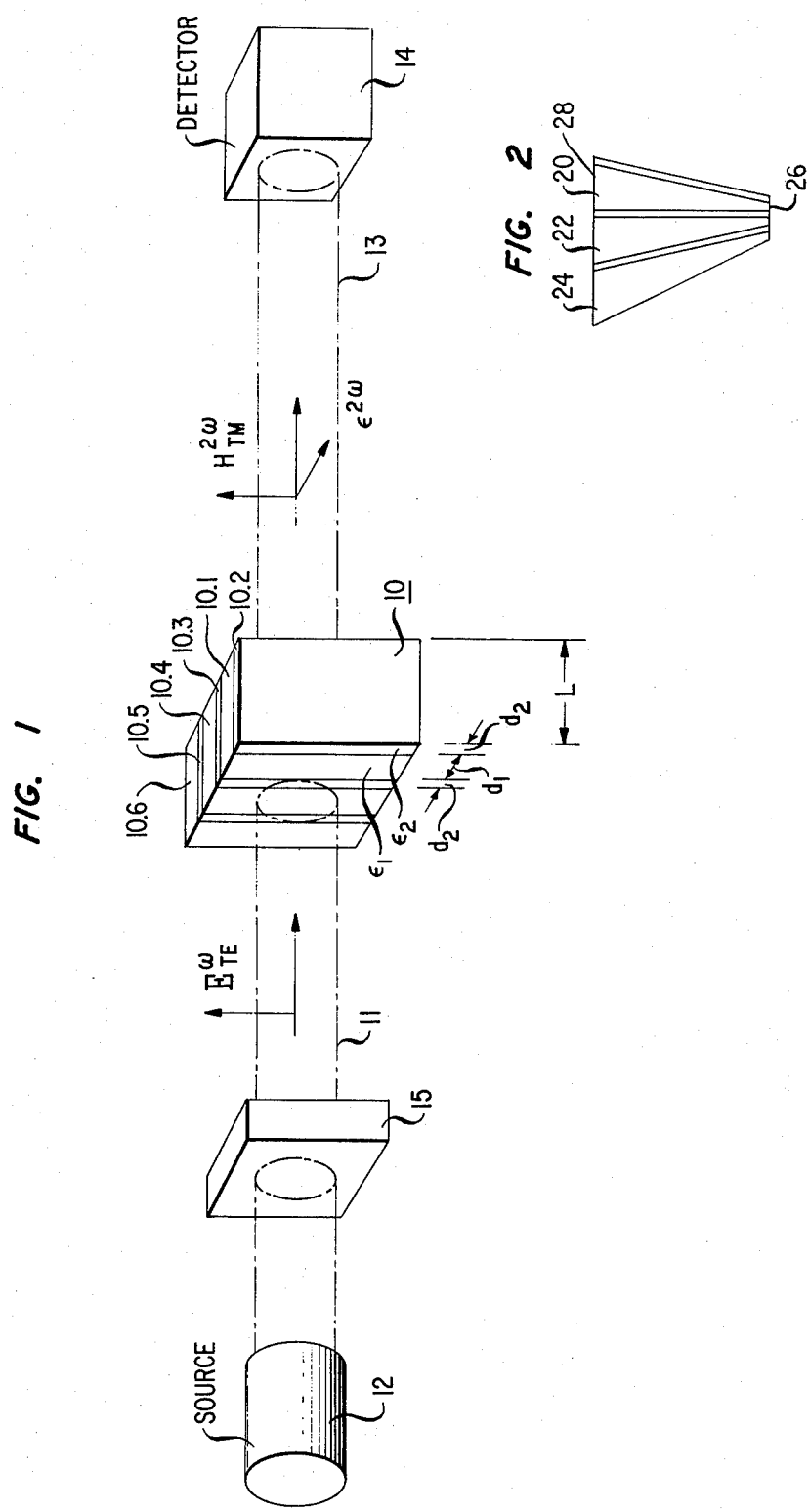

PHASE MATCHING IN A LAMINAR STRUCTURE

BACKGROUND OF THE INVENTION

This invention relates to effects in nonlinear optical materials and, more particularly, to phase matched second harmonic generation.

A number of nonlinear optical materials have large optical nonlinearities, but either are optically isotropic or have only a small birefringence so that collinear optical beams cannot be phase matched. In this category of materials are cubic semiconductors such as ZnS, GaAs and GaP. Several methods have been proposed which introduce an effective optical anisotropy and are capable of cancelling the effect of natural dispersion. N. Bloembergen et al, Applied Physics Letters, Vol. 17, p. 483 (1970), proposed a periodic structure comprising many alternating layers of two semiconductors and utilized the change in the dispersion curve for optical radiation propagating perpendicular to the layers. An alternative proposal by Y. Yacoby et al, J. Applied Physics, Vol. 44, p. 3180 (1973), utilized a multilayered medium in which the sign of the nonlinearity alternated every coherence length.

A second category of prior art devices involves phase matching in a waveguide in which waveguide dispersion produces an effective anistropy for different modes. See D. B. Anderson et al, Applied Physics Letters, Vol. 19, p. 266 (1971) and U.S. Pat. No. 3,537,020 issued on Oct. 27, 1970.

The class of prior art devices which utilizes a multilayered structure with the radiation propagating perpendicular to the layers suffers from the need for a large number of such layers (often a hundred or more) in which thickness and composition must be critically controlled. On the other hand, prior art devices incorporating a waveguide pay a penalty in a large reduction in the effective nonlinear constant whenever the fundamental and second harmonic fields do not have the same mode order.

SUMMARY OF THE INVENTION

In accordance with one embodiment of my invention, phase matched second harmonic generation is achieved in a multilayered or laminar structure of two alternating materials in which the optical radiation is a plane wave propagating parallel to the layers. At least one of the two materials is nonlinear. Anisotropy results from the layered nature of the structure and phase matching results by judicious choice of the relative thicknesses of the layers.

BRIEF DESCRIPTION OF THE DRAWING

My invention together with its various features and advantages can be easily understood from the following more detailed description taken in conjunction with the accompanying drawing, in which:

FIG. 1 depicts an illustrative embodiment of my invention comprising a multilayered structure of two alternating materials, optical radiation propagating parallel to the layers; and FIG. 2 depicts another embodiment of my invention.

DETAILED DESCRIPTION

Turning now to FIG. 1, there is shown an illustrative embodiment of my invention comprising a second harmonic generator (SHG) 10 positioned to receive a beam 11 of optical radiation at a fundamental frequency $\omega$ from source 12, typically a laser. Beam 11 passes through SHG 10 which, by virtue of its anisotropy, converts a portion of the beam energy into a beam 13 at the second harmonic $2\omega$. The second harmonic is received by utilization means such as detector 14.

The anisotropy of SHG 10 results from its laminated structure of two alternating materials at least one which is nonlinear. In each pair of layers, one layer 10.1 has a thickness, $d_1$, and dielectric constant $\epsilon_1$, whereas the contiguous layer 10.2 has a thickness $d_2$ and dielectric constant $\epsilon_2$. In general, $d_1$ and $d_2$ are not equal. To enhance the nonlinear effect at least the thicker of the two layers should be a nonlinear material.

Beam 11 is a plane wave which propagates parallel to the layers of SHG 10. The normal modes therefore have TE or TM polarization, and because the effective dielectric or magnetic permeabilites are not the same, the light waves propagate with slightly different velocities. For a nonmagnetic material the effective dielectric constant is greater for a TE than a TM polarized wave and one can look for phase matching using a TE fundamental (designated $E_{TE}^{\omega}$ for beam 11) and a TM second harmonic (designated $H_{TM}^{2\omega}$ for beam 13). The polarization of the second harmonic beam 13 is determined solely by the geometry of the crystals which make up the layers of SHG 10.

Consider now the case when the pair of layers 10.1 and 10.2 have thicknesses $d_1$ and $d_2$ which are small compared to the wavelength of the fundamental radiation. The solution of Maxwell's equations can then be expressed in terms of average dielectric constants which to lowest order are $$\epsilon_{TE} = \frac{\epsilon_1 d_1 + \epsilon_2 d_2}{d_1 + d_2} \tag{1}$$

and $$1/\epsilon_{TM} = \frac{(d_1/\epsilon_1) + (d_2/\epsilon_2)}{d_1 + d_2} \tag{2}$$

for the TE and TM modes respectively.

The index mismatch $\Delta n$ for a TE fundamental and a TM harmonic is now obtained from the averaged dielectric constants $$\Delta n = (\epsilon_{TM}^{2\omega})^{1/2} - (\epsilon_{TE}^{\omega})^{1/2}. \tag{3}$$

The dispersion $D_{TE}$ of the TE polarized wave between $2\omega$ and $\omega$ is $$D_{TE} = (\epsilon_{TE}^{2\omega})^{1/2} - (\epsilon_{TE}^{\omega})^{1/2}. \tag{4}$$

and has a value between the dispersion of the two layers 10.1 and 10.2.

Phase matching is obtained when $\Delta n = 0$ which requires that the relative thickness of the two layers satisfies $$(1 - \frac{\epsilon_1^\omega}{\epsilon_2^{2\omega}}) \ (\frac{d_2}{d_1})^2 + (2 - \frac{\epsilon_2^\omega}{\epsilon_1^{2\omega}} - \frac{\epsilon_1^\omega}{\epsilon_2^{2\omega}}) \ (\frac{d_2}{d_1})$$
$$+ (1 - \frac{\epsilon_1^\omega}{\epsilon_1^{2\omega}}) = 0. \quad (5)$$

Phase matching implies the existence of real solutions of equation (5) which in turn imposes the following condition:

$$(1 - \frac{\epsilon_1^\omega}{\epsilon_2^\omega} \frac{\epsilon_1^{2\omega}}{\epsilon_2^{2\omega}})^2 \geq 4 (1 - \frac{\epsilon_1^\omega}{\epsilon_2^\omega}) \ (1 - \frac{\epsilon_1^{2\omega}}{\epsilon_2^{2\omega}}) \ (\frac{\epsilon_1^{2\omega}}{\epsilon_2^\omega}) \ . \quad (6)$$

The indices of refraction (i.e., dielectric constants) of the two layers should be sufficiently different in order to cause a cancellation of the natural dispersion.

The foregoing conditions are now applied to the case in which the alternating layers of SHG 10 comprise GaAs (layer 10.1) and GaP (layer 10.2). Consider second harmonic generation at 10.6 $\mu$m fundamental where the dispersion is relatively small. Substituting the indices of GaAs, $n_1^\omega = 3.27$, $n_1^{2\omega} = 3.30$ and of GaP, $n_2^\omega = 3.0$ and $n_2^{2\omega} = 3.01$ shows that equation (6) cannot be satisfied.

On the other hand it has been demonstrated that a superlattice of alternating layers of GaAs and $Al_x$-$Ga_{1-x}$As can be grown on a GaAs substrate by molecular beam epitaxy. See, for example, A. Y. Cho, Applied Physics Letters, Vol. 19, p 467 (1971). Consider phase matching at a fundamental of about 10 $\mu$m. For AlAs($x = 1$), the refractive index data extrapolated from the near infrared to 10.6 $\mu$m and 5.3 $\mu$m yields $n_2^\omega = 2.858$, $n_2^{2\omega} = 2.86$ and the ratio $d_2/d_1$ of the layer thicknesses from equation (5) can be either 40.6 or 0.318. The effective nonlinearity is given by the average of the nonlinearities weighted by the product of the harmonic and the square of the fundamental field intensities. Hence the ratio 0.318 is to be preferred, because from Miller's rule (R. C. Miller, Applied Physics Letters, Vol. 15, p. 17 (1964)), the nonlinearity of AlAs is expected to be somewhat smaller than that of GaAs. Illustratively $d_2 = 0.318$ $\mu$m (3180 Angstroms) and $d_1 = 1.0$ $\mu$m. Thus, the layer with the larger nonlinearity (GaAs) is made to be the thicker layer ($d_1$; layer 10.1).

Phase matching of fundamental optical radiation (beam 11) at other wavelengths can be achieved using other materials for the layers of SHG 10. Thus, phase matching of of about 1 $\mu$m radiation (e.g., 1.06 $\mu$m) is attainable using layers of $\beta$ - ZnS with $n_1^\omega = 2.289$ and $n_1^{2\omega} = 2.400$ and fused silica glass with $n_2^\omega = 1.4495$ and $n_2^{2\omega} = 1.4610$. The relative layer thicknesses from equation (5) are $d_2/d_1 = 52.15$ or 0.11. Because the glass is a linear medium, the ratio 0.11 is preferred and yields an effective nonlinearity which is only slightly smaller than the value of bulk $\beta$ - ZnS. Illustratively $d_2 = 0.055$ $\mu$m (550 Angstroms) for glass and $d_1 = 0.5$ $\mu$m for $\beta$ - ZnS.

In contrast with prior art techniques wherein the fundamental beam is directed perpendicular to the layers of a multilayered structure, and necessitates hundreds of layers, my invention may utilize considerably fewer depending on the transverse size of the beam. The magnitude of the second harmonic effect, aside from the inherent conversion efficiency of the materials of the layers, is determined by their length L.

It is to be understood that the above-described arrangements are merely illustrative of the many possible specific embodiments which can be devised to represent application of the principles of our invention. Numerous and varied other arrangements can be devised in accordance with these principles by those skilled in the art without departing from the spirit and scope of the invention. In particular, because the relative thickness of the two layers determines the phase matching condition, phase matching over a wide frequency range can be obtained by making the thickness ratio of the layer pairs vary with position in a direction transverse to the fundamental beam 11. For example, assume layer pairs 10.1 and 10.2, 10.3 and 10.4, 10.5 and 10.6, have thickness ratios $R_1$, $R_2$ and $R_3$, respectively, which enable phase matching at fundamental frequencies $f_1$, $f_2$ and $f_3$, respectively. Then, by translating the fundamental beam 11 in the direction of changing R (e.g., from layer 10.2 to 10.6), the frequency of the fundamental can be changed from $f_1$ to $f_2$ to $f_3$ while maintaining phase matched conditions at the corresponding beam positions. Translation of beam 11 may be effected by numerous means well known in the art including manually or mechanically moving source 12 or by positioning a beam deflector or scanner 15 between source 12 and SHG 10. Alternatively, a similar effect can be attained by tapering at least one of the layers in each pair. As shown in FIG. 2 layers 20, 22 and 24 have tapered thicknesses. The fundamental beam propagating perpendicular to the plane of the paper (i.e., parallel to the layers) would be scanned or moved in the direction of the tapers, e.g., from the narrower end 26 to the wider end 28. Because of the tapered layers, the ratio of the layer thicknesses, and hence the phase matching condition, changes with position.

What is claimed is:

1. A nonlinear optical device comprising a multilayered body including a plurality of pairs of layers of material having sufficiently different refractive indices to substantially cancel dispersion produced when a plane wave optical beam at a fundamental frequency propagates through said layers and parallel thereto, at least one of said layers of each pair comprising a nonlinear material and the thickness of said layers relative to one another being effective to phase match said beam to the second harmonic thereof and being smaller than the wavelength corresponding to said fundamental frequency.

2. The device of claim 1 wherein in each pair the layers have different thicknesses and said at least one layer comprising nonlinear material is the thicker layer.

3. The device of claim 2 wherein in each pair one of said layers has dielectric constants $\epsilon_1^\omega$ and $\epsilon_1^{2\omega}$ at the fundamental and second harmonic frequencies respectively, and the other of said layers has dielectric constants $\epsilon_2^\omega$ and $\epsilon_2^{2\omega}$ at the fundamental and second harmonic frequencies respectively, which satisfy the condition that $$\left(1-\frac{\epsilon_1^\omega}{\epsilon_2^\omega}\frac{\epsilon_1^{2\omega}}{\epsilon_2^{2\omega}}\right)^2 \geq 4 \left(1-\frac{\epsilon_1^\omega}{\epsilon_2^\omega}\right)$$
$$\left(1-\frac{\epsilon_1^{2\omega}}{\epsilon_2^{2\omega}}\right) \quad \left(\frac{\epsilon_1^{2\omega}}{\epsilon_2^\omega}\right)$$

4. The device of claim 1 wherein in each pair one of said layers comprises GaAs and the other comprises AlAs.

5. The device of claim 4 wherein in each pair said GaAs layer is thicker than said AlAs layer and the ratio of the thicknesses of said layers is about 0.318 for phase matching of a fundamental frequency corresponding to about 10.6 $\mu$m.

6. The device of claim 1 wherein in each pair one of said layers comprises $\beta$ - ZnS and the other comprises fused silica glass.

7. The device of claim 6 wherein in each pair said $\beta$ - ZnS layer is thicker than said glass layer and the ratio of the thicknesses of said layers is about 0.11 for phase matching at a fundamental frequency corresponding to about 1.06 $\mu$m.

8. The device of claim 1 wherein different pairs of said plurality having different ratios of the thicknesses of its corresponding layers, each of said ratios enabling phase matching to a different fundamental frequency.

9. The device of claim 1 wherein in each pair the thickness of at least one of said layers is tapered, thereby to allow phase matching at different fundamental frequencies at different points along the direction of the taper.

10. Optical apparatus comprising:
a source of optical first radiation at a fundamental frequency,
means for generating from said first radiation second radiation at the second harmonic of said first radiation,
utilization means for detecting said second radiation,
CHARACTERIZED IN THAT (1) said first radiation is a plane wave; (2) said generating means comprises a multilayered body including a plurality of pairs of layers of material having sufficiently different refractive indices to substantially cancel dispersion produced when said first radiation propagates therethrough; (3) at least one of said layers of said each pair comprising a nonlinear material; (4) said body is oriented so that said first radiation propagates parallel to said layers; and (5) the thicknesses of said layers relative to one another are effective to phase match said first radiation to said second radiation, and are smaller than the wavelength of said first radiation.

11. The apparatus of claim 10 wherein in each pair said layers have different thicknesses and said at least one layer comprising nonlinear material is the thicker layer.

12. The apparatus of claim 10 wherein in each pair one of said layers has dielectric constants $\epsilon_1^\omega$ and $\epsilon_1^{2\omega}$ at said fundamental frequency and second harmonic, respectively, and the other of said layers has dielectric constants $\epsilon_2^\omega$ and $\epsilon_2^{2\omega}$ at said fundamental frequency and second harmonic, respectively, which satisfy the condition that $$\left(1-\frac{\epsilon_1^\omega}{\epsilon_2^\omega}\frac{\epsilon_1^{2\omega}}{\epsilon_2^{2\omega}}\right)^2 \geq 4 \left(1-\frac{\epsilon_1^\omega}{\epsilon_2^\omega}\right)$$
$$\left(1-\frac{\epsilon_1^{2\omega}}{\epsilon_2^{2\omega}}\right) \quad \left(\frac{\epsilon_1^{2\omega}}{\epsilon_2^\omega}\right)$$

13. The apparatus of claim 10 wherein said fundamental frequency corresponds to a wavelength of about 10 $\mu$, in each pair the thicker of said layers comprises GaAs and the other of said layers comprises AlAs, and the ratio of the thicknesses of said layers is about 0.3.

14. The apparatus of claim 10 wherein said fundamental frequency corresponds to a wavelength of about 1 $\mu$m, in each pair the thicker of said layers comprises $\beta$ - ZnS and the other of said layers comprises fused silica glass, and the ratio of the thicknesses of said layers is about 0.1.

15. The apparatus of claim 10 wherein said source is capable of producing radiation in a range of fundamental frequencies, different ones of said plurality of pairs having different ratios of the thicknesses of its corresponding layers, each of said ratios enabling phase matching to a different fundamental frequency, and including means for translating said first radiation to at least one of said pairs which produces phase matching at the fundamental frequency of said first radiation.

16. The apparatus of claim 10 wherein said source is capable of producing radiation in a range of fundamental frequencies, in each pair the thickness of at least one of said layers is tapered, thereby to allow phase matching at different fundamental frequencies at different points along the direction of the taper, and including means for translating said first radiation in the direction of the taper.

* * * * *